United States Patent
Shin et al.

(10) Patent No.: US 8,468,523 B2
(45) Date of Patent: Jun. 18, 2013

(54) NETWORK APPARATUS AND METHOD FOR SUPPORTING NETWORK VIRTUALIZATION

(75) Inventors: Myung-Ki Shin, Daejeon-si (KR); Sang-Jin Jeong, Daejeon-si (KR); Hyoung-Jun Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 296 days.

(21) Appl. No.: 12/876,643

(22) Filed: Sep. 7, 2010

(65) Prior Publication Data

US 2011/0099563 A1    Apr. 28, 2011

(30) Foreign Application Priority Data

Oct. 26, 2009    (KR) .................. 10-2009-0101859

(51) Int. Cl.
　　*G06F 9/455*　　(2006.01)
　　*G06F 17/30*　　(2006.01)
　　*G06F 9/44*　　(2006.01)

(52) U.S. Cl.
　　USPC ....... 718/1; 726/2; 726/26; 719/328; 717/100

(58) Field of Classification Search
　　USPC .................. 717/100; 718/1; 719/328; 726/2, 726/26
　　See application file for complete search history.

(56) References Cited

U.S. PATENT DOCUMENTS

| | | | |
|---|---|---|---|
| 7,558,723 | B2 | 7/2009 | Traut |
| 2007/0165615 | A1* | 7/2007 | Shin et al. ............. 370/356 |
| 2007/0255798 | A1* | 11/2007 | Schneider ............. 709/217 |
| 2008/0288940 | A1* | 11/2008 | Adams et al. ............. 718/1 |
| 2008/0288941 | A1* | 11/2008 | Adams et al. ............. 718/1 |
| 2009/0132840 | A1* | 5/2009 | Talwar et al. .......... 713/320 |
| 2009/0249335 | A1* | 10/2009 | Vasilevsky et al. ....... 718/1 |
| 2012/0304285 | A1* | 11/2012 | Simeral et al. .......... 726/21 |

OTHER PUBLICATIONS

A dissertation entitled "Supercharging PlanetLab—A high performance, Multi-Application, Overlay Network Platform".

* cited by examiner

*Primary Examiner* — Charles E Anya
(74) *Attorney, Agent, or Firm* — Staas & Halsey LLP

(57) ABSTRACT

A network apparatus and a network virtualization support method. The network apparatus may include a software-based virtualization unit to generate a software-based virtualization slice in association with another network apparatus; a hardware-based virtualization unit to generate a hardware-based virtualization slice in association with another network apparatus; and a virtualization control unit to activate the software-based virtualization unit or the hardware-based virtualization unit based on the user information of the user who requests generation of the virtualization slice.

6 Claims, 4 Drawing Sheets

NETWORK APPARATUS AND METHOD FOR SUPPORTING NETWORK VIRTUALIZATION

CROSS-REFERENCE TO RELATED APPLICATION

This application claims the benefit under 35 U.S.C. §119(a) of Korean Patent Application No. 10-2009-0101859, filed on Oct. 26, 2009, the entire disclosure of which is incorporated herein by reference for all purposes.

BACKGROUND

1. Field

The following description relates to a network technology, more particularly, to a network virtualization supporting method for implementing a virtual network in a physical network apparatus.

2. Description of the Related Art

PlanetLab, one conventional network virtualization supporting method, only supports the generation of software-based slices. On the other hand, Supercharging PlanetLab as an advanced form of PlanetLab only supports the generation of static hardware-based slices.

For example, PlanetLab develops a program to be run on a node, that is, a network apparatus, with a traditional C programming application programming interface (API) such as a socket. The developed program is statically uploaded on the node, and then a software-based virtualization slice is generated according to Layer 3 (L3) tunneling protocols.

Meanwhile, Supercharging PlanetLab generates a program at a level of a hardware-dependent or hardware-specific assembly language or machine language, and loads the program to a node, thereby running the program to generate a hardware-based virtualization slice. That is, the hardware-based slice generation method can generate the virtualization slice fast using the hardware-based fast packet forwarding method. However, to generate the virtualization slice, necessary codes should be programmed separately for individual pieces of hardware and statically loaded to a node such as a router.

Both of the above two conventional methods separately implement codes and statically upload the codes to a node, and thus they have the limitation that the codes cannot be installed in the node dynamically. For example, a software-based slice and a hardware-based slice cannot be selectively generated according to user characteristics, for example, depending on a business model, in a single node.

SUMMARY

In one general aspect, provided is a network apparatus performing software-based virtualization or hardware-based virtualization based on user information of a user who requests generation of a virtualization slice. The network apparatus may comprise: a software-based virtualization unit to generate a software-based virtualization slice in association with another network apparatus; a hardware-based virtualization unit to generate a hardware-based virtualization slice in association with another network apparatus; and a virtualization control unit to activate the software-based virtualization unit or the hardware-based virtualization unit based on the user information of the user who requests generation of the virtualization slice.

The network apparatus may further comprise an open application programming interface (API) for communication with an external network, and the open API may provide an API list, and the software-based virtualization unit and the hardware-based virtualization unit may take reference to the provided API list to make a virtualization program.

The network apparatus may further comprise an interface conversion unit to convert a generation code of the software-based slice which is input to the open API into an API code supported by hardware when the hardware-based virtualization unit generates the hardware-based virtualization slice.

In another general aspect, provided is a network virtualization support method performing software-based virtualization or hardware-based virtualization based on user information of a user who requests generation of a virtualization slice. The network virtualization support method may comprise: determining whether to generate a software-based virtualization slice or a hardware-based virtualization slice based on the user information of the user who requests generation of the virtualization slice; and generating a software-based virtualization slice or a hardware-based virtualization slice in association with another network apparatus according to a result of the determination.

The generating of the software-based virtualization slice or the hardware-based virtualization slice may include, when it is determined that the hardware-based virtualization slice is to be generated, converting a generation code of the software-based slice into an application programming interface (API) code supported by hardware, and generating the hardware-based virtualization slice based on the converted API code.

Other features and aspects will be apparent from the following detailed description, the drawings, and the claims.

Figure 1:
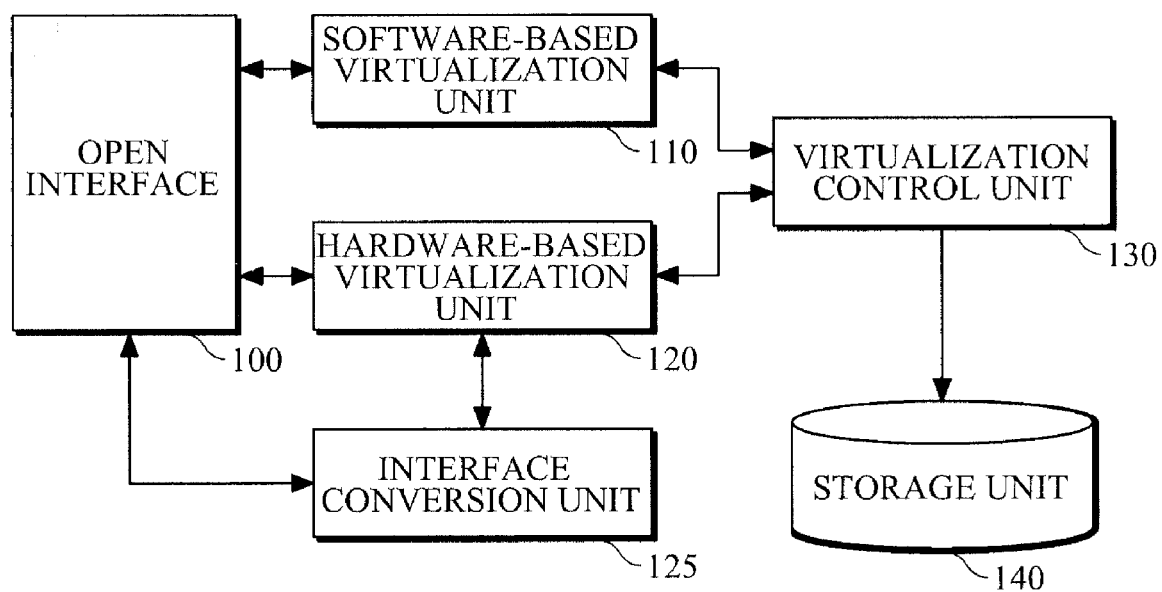
FIG. 1 is a diagram illustrating an example of a network apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a network apparatus. Referring to the example illustrated in FIG. 1, the network apparatus includes an open interface 100, a software-based virtualization unit 110, a hardware-based virtualization unit 120, an interface conversion unit 125, a virtualization control unit 130, and a storage unit 140.

In the example illustrated in FIG. 1, the open interface 100 is an open application programming interface (API), and is an interface that is created by a programmer for program development. In one example, the open interface 100 is an open API for wired/wireless communications, allowing wired/wireless call connections, a short message service, location information provision, and the like. The open API may be provided for communication with an external network including an open gateway.

The software-based virtualization unit 110 and the hardware-based virtualization unit 120 create a slice that is a virtual machine to allow users to access the network apparatus.

In detail, in one example, the software-based virtualization unit 110 may be implemented as a virtual machine monitor (VMM) software solution, that is, middleware such as a hypervisor. The software-based virtualization unit 110 provides a connection between physical server and operating systems (OSes) to enable two or more OSes and applications to share hardware. The software-based virtualization unit 110 enables a hardware interface to use a virtual machine. The software-based virtualization unit 110 may generate a software-based virtualization slice in association with another network apparatus.

The hardware-based virtualization unit 120 runs a hardware-dependent assembly language program or a machine language program to create a hardware-based virtualization slice. The hardware-based virtualization unit 120 may generate a hardware-based virtualization slice in association with another network apparatus. The hardware-based virtualization unit 120 may support a virtualization program in various ways according to hardware specification of the network apparatus, and in the case of a router node, the hardware-based virtualization unit 120 may support functions of hardware in use differently according to a type of a processor chip of the hardware. For example, an Intel processor chip writes a program in a machine language such as an assembly language and installs the program in hardware. An OCTEON-based processor chip writes a program using an API such as a C programming language and installs the program in hardware. Once the hardware-based virtualization slice is created, hardware-based forwarding function such as dynamic packet generation may be supported.

The interface conversion unit 125 may be implemented as an API converter. In the example of FIG. 1, the interface conversion unit 125 converts a program code in a manner that creates the hardware-based slice in accordance with hardware specifications.

The storage unit 140 may be implemented as a memory device. In the example of FIG. 1, the storage unit 140 stores user information of a user who uses a network service including the network apparatus.

The virtualization control unit 130 determines whether to create a software-based virtualization slice or a hardware-based virtualization slice based on various business models. The virtualization control unit may activate the software-based virtualization unit 110 or the hardware-based virtualization unit 120 based on the user information of the user who requests generation of the virtualization slice. In the example, the virtualization control unit 130 may authenticate and authorize a user who requests the creation of a slice, based on the user information stored in the storage unit 140. Additionally, the virtualization control unit 130 may determine, for example, whether the user is a special (VIP) customer who pays for more services than other users based on the stored user information, and if the user is a special (VIP) customer, the virtualization control unit 130 may determine to create the hardware-based virtualization slice that is faster than the software-based virtualization slice. However, the determination of the virtualization control unit 130 is not limited to the above, and the virtualization control unit 130 may make decision whether to create the hardware-based virtualization slice or the software-based virtualization slice according to various standards.

Figure 2:
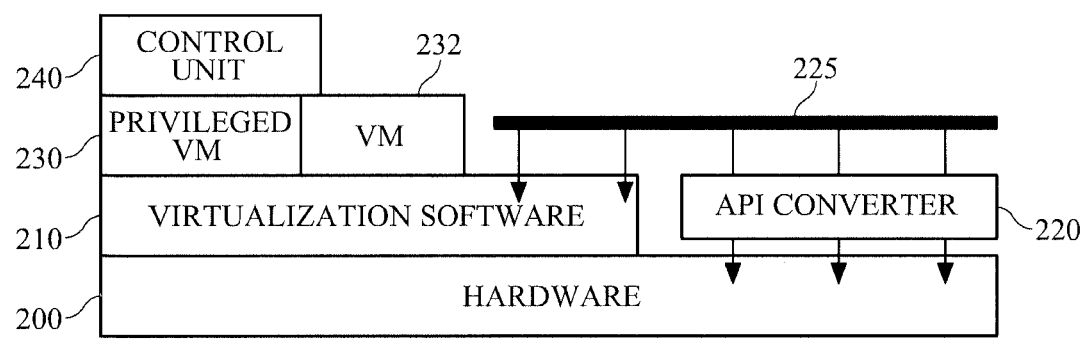
FIG. 2 is a diagram illustrating an example of how a network apparatus performs network virtualization support.

FIG. 2 illustrates an example of how a network apparatus performs network virtualization support. Referring to the example illustrated in FIG. 2, a platform structure of the network apparatus includes a piece of hardware 200, a piece of virtualization software 210, a control unit 240, an open API 255, and an API converter 220.

To create a software-based virtualization slice, the virtualization software 210 generates a new virtual machine 232 using a privileged virtual machine 230. Then, the generated new virtual machine 232 is connected to a virtual machine of another network apparatus through a communication technique such as layer 3 (L3) tunneling to generate the software-based slice.

To create a hardware-based virtualization slice, a hardware-based forwarding function such as dynamic packet generation is supported. The hardware-based forwarding function including the dynamic packet generation may be supported in various ways according to specifications of the hardware 200, and in the case of a router node, the hardware-based forwarding function may be supported differently according to a type of a processor chip of the hardware 200. For example, an Intel processor chip writes a program in a machine language such as an assembly language and installs the program in hardware. An OCTEON-based processor chip writes a program using an API such as a C programming language and installs the program in hardware.

The control unit 240 controls and manages both the software-based slice and the hardware-based slice. In the example of FIG. 2, the control unit 240 provides an end-to-end virtualization slice to network apparatuses. In addition, the control unit 240 authenticates and authorizes a user through the open interface 225 to identify if the user is a certified user, a special user, or a general user.

The control unit 240 identifies whether a program maker who will upload a program to the network apparatus is a special user or a general user. The identifying of the user may be performed by checking the user authentication and authorization function. For example, if the program maker is a special user who pays more for use of the services, the control unit 240 may support the generation of the hardware-based virtualization slice which is faster than the software-based virtualization slice. In this case, the API converter 220 converts a program that has been developed by the user through the open API 225 into a code compatible to the hardware-based virtualization slice suitable for the hardware in the network apparatus, and dynamically loads the code onto the hardware in the network apparatus to run. The standards for the special user may be determined according to internal procedures or policies.

The open API 225 allows the user to load a desired program onto virtual software or virtual hardware in the network apparatus. In the example, the open API 225 may be configured to provide an API list that is required for developing a program to be run in the network apparatus and accordingly allow the user to create a program to be run on a software-based virtualization slice or a hardware-based virtualization slice with the same effort.

The API converter 220 is operable to covert a code of the program such that a hardware-based slice can be generated according to hardware specifications when the program is created by the special user who has been authenticated and authorized. The API converter 220 converts the program code to generate the hardware-based slice in accordance with the hardware specifications. The program code conversion by the API converter 220 is the conversion into an API program code provided by the processor chip of the network apparatus. For example, an OCTEON chip may perform the code conversion using C API as below which supports hardware forwarding.

```
work_request_sync( )            /*get work/
cvmx_pow_send_packet_prepare( ) /*packet building*/
cvmx_pow_send_packet_finish( )  /*packet sending*/
```

Figure 3:
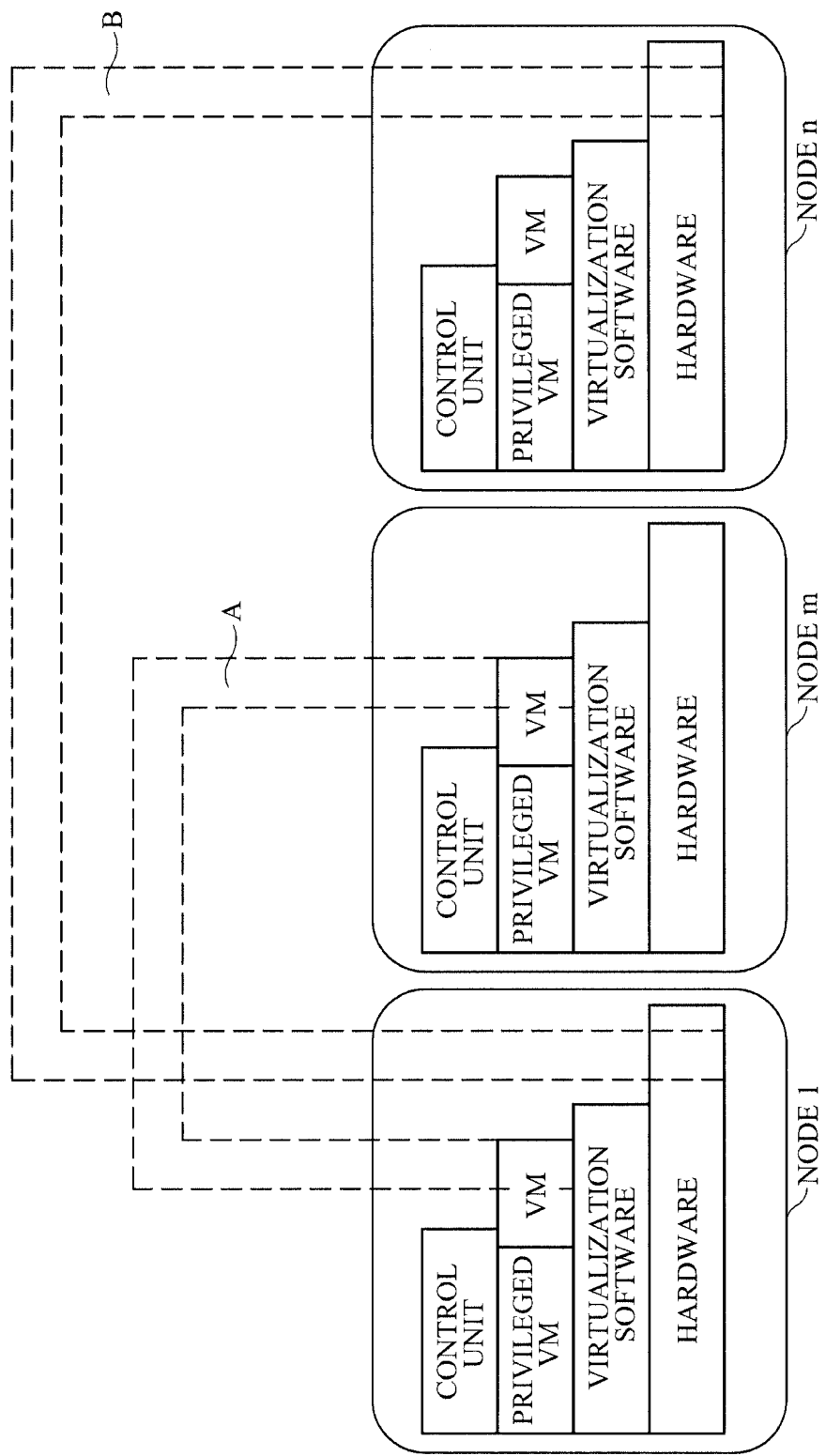
FIG. 3 is a diagram illustrating an example of a network apparatus that serves both a software-based virtualization function and a hardware-based virtualization function.

FIG. 3 illustrates an example of a network apparatus that serves both a software-based virtualization function and a hardware-based virtualization function.

As shown in the example illustrated in FIG. 3, a node 1 is able to support the generation of a software-based virtualization slice A with respect to a node M as well as the generation of a hardware-based virtualization slice B with respect to a node N. the hardware-based virtualization slice B supports a fast process such as hardware forwarding by a router, thereby having a faster processing speed than the software-based virtualization slice A.

Figure 4:
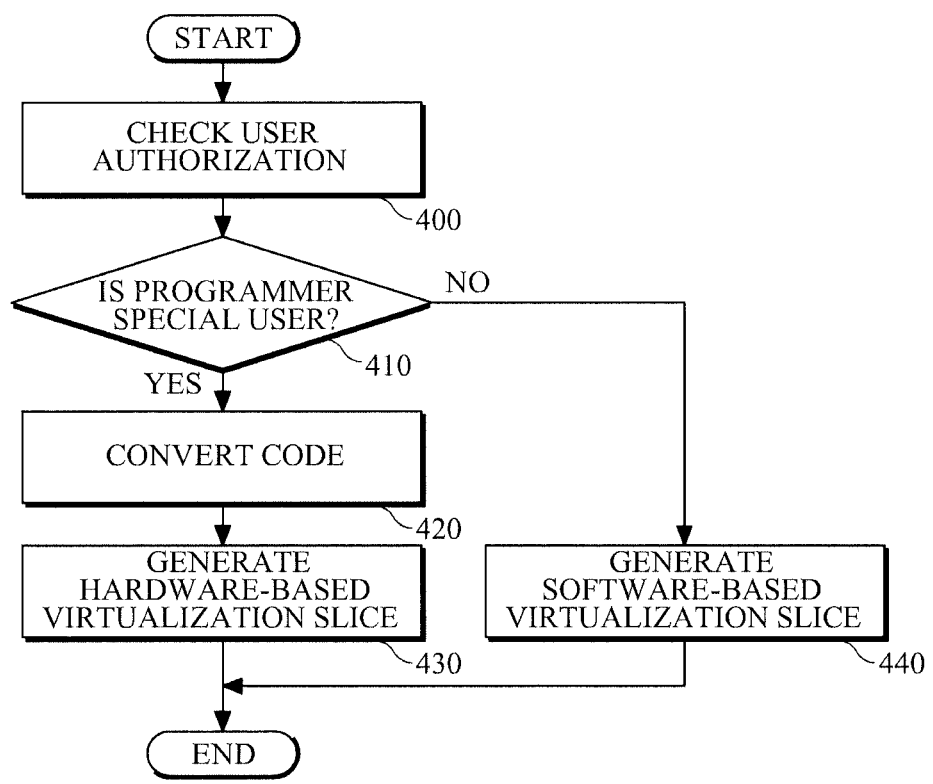
FIG. 4 is a flowchart of an example of a network virtualization support method.

FIG. 4 illustrates a flowchart of an example of a network virtualization support method. First, it is checked whether a programmer who creates a program to be loaded to a network apparatus such as a router is authorized (400). In one example, the check of the authorization of the programmer may be performed by identifying whether the programmer is a general user or a special user based on the programmer's expense for the use of services. The standards for the special user and the general user may be determined in various ways according to internal procedures or policies. In addition, before checking the authorization of the programmer, it may be authenticated whether the programmer is a service subscriber.

If the programmer is a special user that pays more for the use of services (410), the generation of a hardware-based virtualization slice, which is faster than a general software-based virtualization slice, is supported.

To this end, the program created by the special user is converted into a code compatible to a hardware-based virtualization slice suitable to the network apparatus, and is dynamically loaded to the hardware of the network apparatus in which the code is to be run (420). Then, the hardware-based virtualization slice is generated (430).

Meanwhile, if the programmer is a general user, a software-based virtualization slice is generated (440). Virtualization software may use a privileged virtual machine to create a new virtual machine, and connect the generated new virtual machine to a virtual machine of another network apparatus using a communication technique such as L3 tunneling, thereby generating the software-based virtualization slice.

As described above, an open API is designed in a network apparatus such as a router, and based on the designed open API, a program code to be dynamically uploaded to a node can be developed. Accordingly, a hardware-based virtualization slice and a software-based virtualization slice can be selectively generated.

That is, a user who pays more for the use of services may be provided with a faster packet transmission service through the hardware-based virtualization slice, and a general user may be provided with the software-based virtualization slice. Thus, a differentiated service can be provided according to the type of a user.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A network apparatus, comprising:
   a storage unit for storing instructions and user authorization information used and executed by the network apparatus;
   a user unit for requesting a generation of a virtualization slice;
   a virtualization control unit for determining whether to generate a software-based virtualization slice or a hardware-based virtualization slice based on the user information of a user issuing the generation request, wherein the determining includes checking authorization of the user;
   a hardware virtualization unit for generating the hardware-based slice in association with another network apparatus according to a result of the determination, wherein the generating of the hardware-based virtualization slice when it is determined that the hardware-based virtualization slice is to be generated, converting by an interface conversion unit, a generation code of the software-based virtualization slice into an application programming interface (API) code supported by hardware, and generating the hardware-based virtualization slice based on the converted API code; and
   a software-based virtualization unit for generating the software-based virtualization slice when it is determined that the software-based virtualization slice is to be generated, wherein the generating the software-based virtualization slice includes generating a new virtual machine using a privileged virtual machine, connecting the new virtual machine to another virtual machine of another network apparatus to generate the software-based virtualization slice.

2. The network apparatus of claim 1, further comprising: an open application programming interface (API) for communication with an external network including an open gateway.

3. The network apparatus of claim 2, wherein the open API provides an API list, and the software-based virtualization unit and the hardware-based virtualization unit take reference to the provided API list to make a virtualization program.

4. The network apparatus of claim 1, wherein the interface conversion unit is an application programming interface (API) converter.

5. A network virtualization support method of performing software-based virtualization or hardware-based virtualization, the method comprising:

requesting a generation of a virtualization slice;

determining whether to generate a software-based virtualization slice or a hardware-based virtualization slice based on a user information of a user issuing the generation request, wherein the determining includes checking authorization of the user;

generating the hardware-based slice in association with another network apparatus according to a result of the determination, wherein the generating of the hardware-based virtualization slice when it is determined that the hardware-based virtualization slice is to be generated, converting a generation code of the software-based virtualization slice into an application programming interface (API) code supported by hardware, and generating the hardware-based virtualization slice based on the converted API code; and otherwise, generating the software-based virtualization slice, wherein the generating the software-based virtualization slice includes generating a new virtual machine using a privileged virtual machine, connecting the new virtual machine to another virtual machine of another network apparatus to generate the software-based virtualization slice.

6. The network virtualization support method of claim 4, wherein the determining of whether to generate the software-based virtualization slice or the hardware-based virtualization slice includes authenticating whether the user who requests the generation of the virtualization slice is a service subscriber.

\* \* \* \* \*